US012694700B1

(12) United States Patent
Reisman

(10) Patent No.: US 12,694,700 B1
(45) Date of Patent: *Jul. 28, 2026

(54) COMPUTING APPLICATION FOR DETERMINING DATA ASSOCIATED WITH A COMPUTING RECORD USING A PROBABILISTIC MODEL

(71) Applicant: Dark Matter Technologies LLC, Jacksonville, FL (US)

(72) Inventor: Boaz Reisman, Swarthmore, PA (US)

(73) Assignee: Dark Matter Technologies LLC, Jacksonville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/186,344

(22) Filed: Apr. 22, 2025

Related U.S. Application Data

(63) Continuation of application No. 17/669,481, filed on Feb. 11, 2022, now abandoned.

(51) Int. Cl.
*G06V 30/19* (2022.01)
*G06N 7/01* (2023.01)
*G06V 30/164* (2022.01)

(52) U.S. Cl.
CPC ............. *G06V 30/191* (2022.01); *G06N 7/01* (2023.01); *G06V 30/164* (2022.01)

(58) Field of Classification Search
CPC ....... G06V 30/191; G06V 30/164; G06N 7/01
See application file for complete search history.

(56) References Cited

U.S. PATENT DOCUMENTS

| | | | |
|---|---|---|---|
| 2007/0003147 A1 | 1/2007 | Viola et al. | |
| 2013/0007065 A1* | 1/2013 | Grechanik | .............. G06F 16/80 |
| | | | 707/E17.127 |
| 2014/0149409 A1 | 5/2014 | Lamba | |
| 2017/0068866 A1 | 3/2017 | Kostyukov | |
| 2018/0114123 A1* | 4/2018 | Kim | ........................ G06N 5/025 |
| 2020/0320329 A1* | 10/2020 | Bui | ........................ G06F 40/289 |

(Continued)

OTHER PUBLICATIONS

Baviskar, Dipali, et al. "Efficient automated processing of the unstructured documents using artificial intelligence: A systematic literature review and future directions." IEEE Access 9 (2021); 72894-72936. (Mar. 25, 2021).

*Primary Examiner* — Andrae S Allison
(74) *Attorney, Agent, or Firm* — Baker & McKenzie LLP

(57) ABSTRACT

Systems and methods are provided for determining data associated with a computing record using a probabilistic model. An exemplary method includes: receiving at least one computing record; determining image data associated with the at least one computing record; generating, based on the image data, a relational graph; determining a rule associated with processing the at least one computing record; parsing the first rule; generating, based on the parsed rule, an abstract syntax tree; analyzing, based on a first computing record, the abstract syntax tree; generating, based on a computing analysis of the abstract syntax tree, a rule result associated with the rule; applying the rule to the at least one computing record using a probabilistic model; determining, based on the applying the rule to the at least one computing record, an indicator associated with rule results; determining whether the probabilistic model requires an update; and updating the probabilistic model.

23 Claims, 6 Drawing Sheets

(56)                    References Cited

U.S. PATENT DOCUMENTS

| | | | |
|---|---|---|---|
| 2022/0156466 A1 | 5/2022 | Gill et al. | |
| 2022/0318224 A1* | 10/2022 | Thompson ........... | G06V 30/414 |
| 2023/0135880 A1* | 5/2023 | Song ...................... | G06V 30/40 |
| | | | 382/159 |
| 2023/0196748 A1* | 6/2023 | Hariharan ............ | G06V 10/764 |
| | | | 382/103 |
| 2023/0281742 A1* | 9/2023 | Markison ............. | G06Q 50/184 |
| | | | 705/310 |
| 2024/0037970 A1* | 2/2024 | Alabi ................... | G06V 30/153 |
| 2024/0303531 A1* | 9/2024 | Watanabe .............. | G06N 20/00 |
| 2025/0005952 A1* | 1/2025 | Xylouris ............... | G06V 30/41 |

* cited by examiner

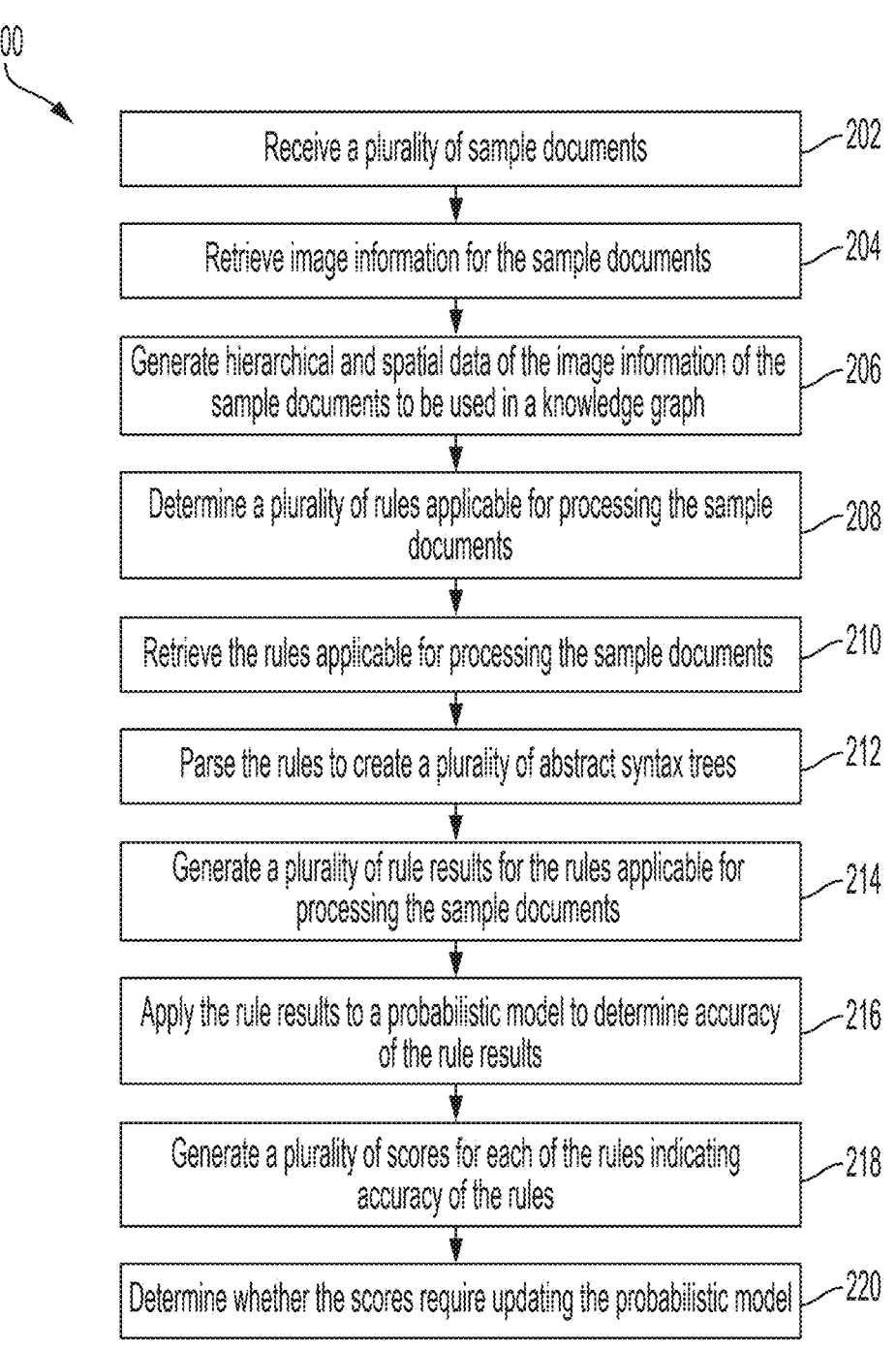

200

| Receive a plurality of sample documents | —202 |

| Retrieve image information for the sample documents | —204 |

| Generate hierarchical and spatial data of the image information of the sample documents to be used in a knowledge graph | —206 |

| Determine a plurality of rules applicable for processing the sample documents | —208 |

| Retrieve the rules applicable for processing the sample documents | —210 |

| Parse the rules to create a plurality of abstract syntax trees | —212 |

| Generate a plurality of rule results for the rules applicable for processing the sample documents | —214 |

| Apply the rule results to a probabilistic model to determine accuracy of the rule results | —216 |

| Generate a plurality of scores for each of the rules indicating accuracy of the rules | —218 |

| Determine whether the scores require updating the probabilistic model | —220 |

FIG. 2A

Update the probabilistic model — 222

FIG. 2B

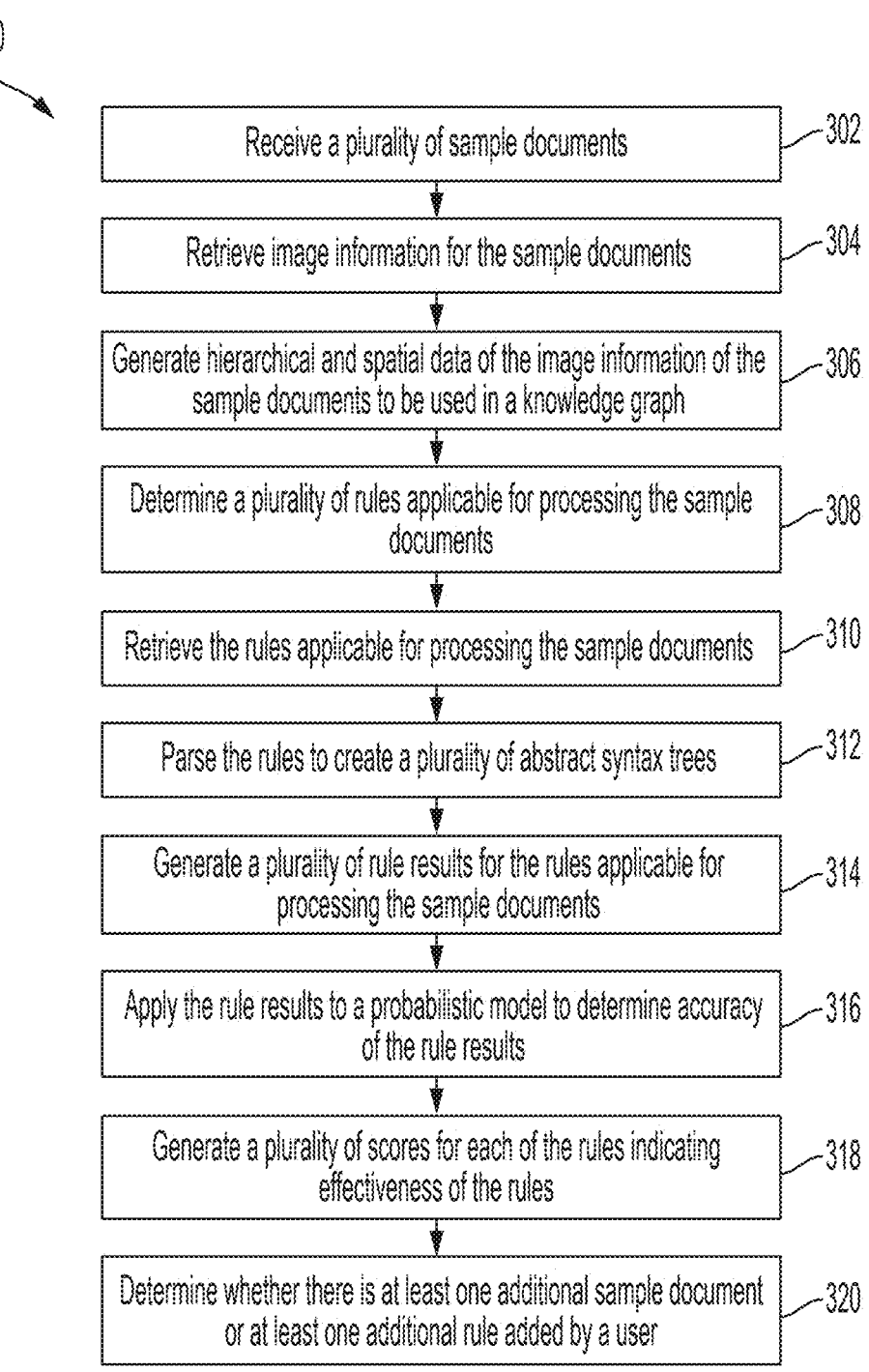

300

| | |
|---|---|
| Receive a plurality of sample documents | 302 |
| Retrieve image information for the sample documents | 304 |
| Generate hierarchical and spatial data of the image information of the sample documents to be used in a knowledge graph | 306 |
| Determine a plurality of rules applicable for processing the sample documents | 308 |
| Retrieve the rules applicable for processing the sample documents | 310 |
| Parse the rules to create a plurality of abstract syntax trees | 312 |
| Generate a plurality of rule results for the rules applicable for processing the sample documents | 314 |
| Apply the rule results to a probabilistic model to determine accuracy of the rule results | 316 |
| Generate a plurality of scores for each of the rules indicating effectiveness of the rules | 318 |
| Determine whether there is at least one additional sample document or at least one additional rule added by a user | 320 |

FIG. 3A

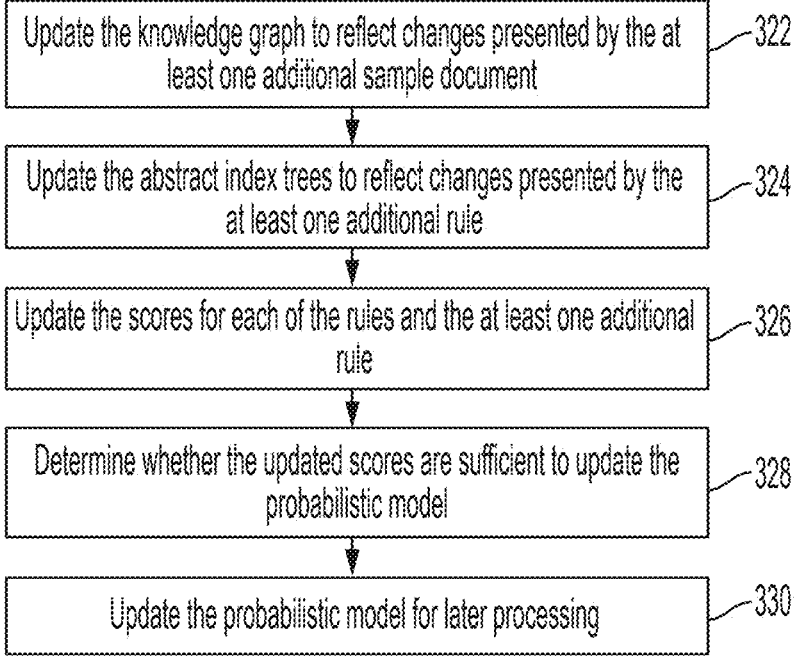

Update the knowledge graph to reflect changes presented by the at least one additional sample document ⎯322

Update the abstract index trees to reflect changes presented by the at least one additional rule ⎯324

Update the scores for each of the rules and the at least one additional rule ⎯326

Determine whether the updated scores are sufficient to update the probabilistic model ⎯328

Update the probabilistic model for later processing ⎯330

FIG. 3B

COMPUTING APPLICATION FOR DETERMINING DATA ASSOCIATED WITH A COMPUTING RECORD USING A PROBABILISTIC MODEL

This application is a continuation of U.S. patent application Ser. No. 17/669,481, filed on Feb. 11, 2022, which is incorporated herein by reference in its entirety for all purposes.

TECHNICAL FIELD

The present disclosure relates to a computing application for determining data associated with a computing record, document, file, or other source of data using an artificial intelligence model.

BACKGROUND

Machine learning models often struggle with documents that are not uniform in layout or content. There is a need for a method for determining specific data associated with computing records or documents using rule-based processing with a probabilistic model.

SUMMARY

In one embodiment of this disclosure, a method for determining data associated with a computing record using a probabilistic model is provided. The method comprises: receiving, using one or more computing device processors, at least one computing record; determining, using the one or more computing device processors, image data associated with the at least one computing record; generating, using the one or more computing device processors, structural data, wherein the structural data is associated with the image data associated with the at least one computing record; generating, using the one or more computing device processors, dimensional data, wherein the dimensional data is associated with the image data associated with the at least one computing record; determining, using the one or more computing device processors, based on the structural data and the dimensional data, a relational graph, wherein the relational graph defines relationships associated with the at least one computing record; determining, using the one or more computing device processors, a first rule associated with processing the at least one computing record; parsing, using the one or more computing device processors, the first rule, thereby generating a first parsed rule; generating, using the one or more computing device processors, based on the first parsed rule, an abstract syntax tree; first analyzing, using the one or more computing device processors, based on a first computing record comprised in the at least one computing record, the abstract syntax tree; generating, using the one or more computing device processors, based on the first analyzing the abstract syntax tree, a first rule result associated with the first rule; applying, using the one or more computing device processors, the first rule to a probabilistic model, wherein the applying the first rule to the probabilistic model comprises: second analyzing, based on the at least one computing record, the abstract syntax tree, and generating, based on the second analyzing the abstract syntax tree, at least one rule result associated with the first rule; determining, using the one or more computing device processors, based on the applying the first rule result to the probabilistic model, a first indicator associated with the first rule result and the at least one rule result; determining, using the one or more computing device processors, based on the first indicator associated with the first rule result and the at least one rule result, whether the probabilistic model requires an update, and upon determining the probabilistic model requires the update, updating, using the one or more computing device processors, the probabilistic model.

In some cases, the determining the image data comprises performing an optical character recognition (OCR) operation on the at least one computing record.

In other cases, the determining the image data comprises adapting to spatial noise introduced by an optical character recognition (OCR) operation on the at least one computing record.

According to one embodiment, the first indicator associated with the first rule result and the at least one rule result comprises an approximate accuracy or a score or a coverage value associated with the at least one computing record.

In another embodiment, the determining the relational graph comprises adapting to spatial noise.

According to some embodiments, the determining the first rule associated with processing the at least one computing record comprises determining whether the first rule is an existing rule or a rule under development.

In other embodiments, the first rule is associated with a domain specific language.

According to yet other embodiments, the parsing the first rule comprises utilizing a recurrent neural network.

In one embodiment, the applying the first rule to the probabilistic model comprises utilizing a Naïve Bayesian methodology to assess the first rule result.

In another embodiment, the applying the first rule to the probabilistic model comprises allowing the probabilistic model to determine, based on a history of rule results, a selection of the first rule or a first existing rule comprised in at least one existing rule to be applied to a second computing record.

It is appreciated that, in some cases, the determining whether the probabilistic model requires the update comprises identifying a second computing record comprised in the at least one computing record that, upon applying the first rule, does not return a correct result.

In other cases, the determining whether the probabilistic model requires the update comprises determining whether the probabilistic model comprises a first shape.

According to some embodiments, the updating the probabilistic model comprises: determining or receiving, using the one or more computing device processors, a second rule associated with processing the at least one computing record; parsing, using the one or more computing device processors, the second rule, thereby generating a second parsed rule; updating, using the one or more computing device processors, based on the second parsed rule, the abstract syntax tree; third analyzing, using the one or more computing device processors, based on a second computing record comprised in the at least one computing record, the abstract syntax tree; generating, using the one or more computing device processors, based on the third analyzing the abstract syntax tree, a second rule result associated with the second rule; and applying, using the one or more computing device processors, the second rule result to the probabilistic model.

According to another embodiment of this disclosure, a system for determining data associated with a computing record using a probabilistic method is provided. The system includes one or more computing device processors. One or more computing device memories are coupled to the one or more computing device processors. The one or more computing device memories store instructions executed by the one or more computing device processors, the instructions configured to: receive at least one computing record; determine image data associated with the at least one computing record; generate structural data, wherein the structural data is associated with the image data associated with the at least one computing record; generate dimensional data, wherein the dimensional data is associated with the image data associated with the at least one computing record; determine, based on the structural data and the dimensional data, a relational graph, wherein the relational graph defines relationships associated with the at least one computing record; determine a first rule associated with processing the at least one computing record; parse the first rule, thereby generating a first parsed rule; generate, based on the first parsed rule, a syntax tree; first analyze, based on a first computing record comprised in the at least one computing record, the syntax tree; generate, based on the first analyze the syntax tree, a first rule result associated with the first rule; apply the first rule to a probabilistic model, wherein the apply the first rule to the probabilistic model comprises: second analyzing, based on the at least one computing record, the syntax tree, and generating, based on the second analyzing the syntax tree, at least one rule result associated with the first rule; determine, based on the applying the first rule result to the probabilistic model, an indicator associated with the first rule result; determine, based on the indicator associated with the first rule result, whether the probabilistic model requires an update, and upon determining the probabilistic model requires the update, update the probabilistic model.

According to some embodiments, the instructions are further configured to provide a user interface for displaying rules that have been executed.

In other embodiments, the instructions are further configured to provide a user interface for displaying details associated with at least one of the at least one computing record.

According to yet other embodiments, the instructions are further configured to provide a user interface for allowing a user to input at least one of the at least one computing record.

In still other embodiments, the instructions are further configured to provide a user interface for displaying details associated with at least one rule that is being developed.

According to still other embodiments, the instructions are further configured to provide a user interface for displaying details associated with the indicator associated with the first rule result.

In yet another embodiment of this disclosure, a method for determining data associated with a reference record is provided. The method includes: receiving, using one or more computing device processors, at least one computing record; determining, using the one or more computing device processors, image data associated with the at least one computing record; generating, using the one or more computing device processors, structural data, wherein the structural data is associated with the image data associated with the at least one computing record; generating, using the one or more computing device processors, dimensional data, wherein the dimensional data is associated with the image data associated with the at least one computing record; determining, using the one or more computing device processors, based on the structural data and the dimensional data, a relational graph, wherein the relational graph defines relationships associated with the at least one computing record; determining or receiving, using the one or more computing device processors, a first rule associated with processing the at least one computing record; parsing, using the one or more computing device processors, the first rule, thereby generating a first parsed rule; generating, using the one or more computing device processors, based on the first parsed rule, an abstract syntax tree; first analyzing, using the one or more computing device processors, based on a first computing record comprised in the at least one computing record, the abstract syntax tree; generating, using the one or more computing device processors, based on the first analyzing the abstract syntax tree, a first rule result associated with the first rule; applying, using the one or more computing device processors, the first rule to a probabilistic model, wherein the applying the first rule to the probabilistic model comprises: second analyzing, based on the at least one computing record, the abstract syntax tree, and generating, based on the second analyzing the abstract syntax tree, at least one rule result associated with the first rule; determining, using the one or more computing device processors, based on the applying the first rule result to the probabilistic model, a first indicator associated with the first rule result and the at least one first rule result; determining, using the one or more computing device processors, whether there is an additional record or an additional rule added by a user; upon determining the user added the additional record, updating, using the one or more computing device processors, based on the additional record, the relational graph, thereby generating an updated relational graph; upon determining the user added the additional rule, updating, using the one or more computing device processors, based on the additional rule, the abstract syntax tree, thereby generating an updated abstract syntax tree; updating, using the one or more computing device processors, based on the updated relational graph and the updated abstract syntax tree, the first indicator associated with the first rule result and the at least one first rule result, thereby generating an updated first indicator; determining, using the one or more computing device processors, a second indicator associated with a second rule result and at least one second rule result associated with the additional rule; determining, using the one or more computing device processors, based on the updated first indicator and the second indicator, whether the probabilistic model requires an update; and upon determining the probabilistic model requires the update, updating, using the one or more computing device processors, the probabilistic model.

According to one embodiment, the probabilistic model accounts for variance among the at least one computing record.

Furthermore, in some cases, the variance comprises at least one of: spatial variance or linguistic variance.

In other cases, the updating the probabilistic model is based on or associated with the variance among the at least one computing record.

BRIEF DESCRIPTION OF THE DRAWINGS

The disclosure is illustrated by way of example, and not by way of limitation in the figures of the accompanying drawings in which like reference numerals are used to refer to similar elements. The various elements shown in the figures that follow may be optional depending on a given embodiment without departing from the principles provided in this disclosure.

FIGS. 2A-2B are workflows of a method for extracting information from documents, according to one embodiment.

FIGS. 3A-3B are workflows of a method for extracting information from documents, according to one embodiment.

DETAILED DESCRIPTION

Figure 1:
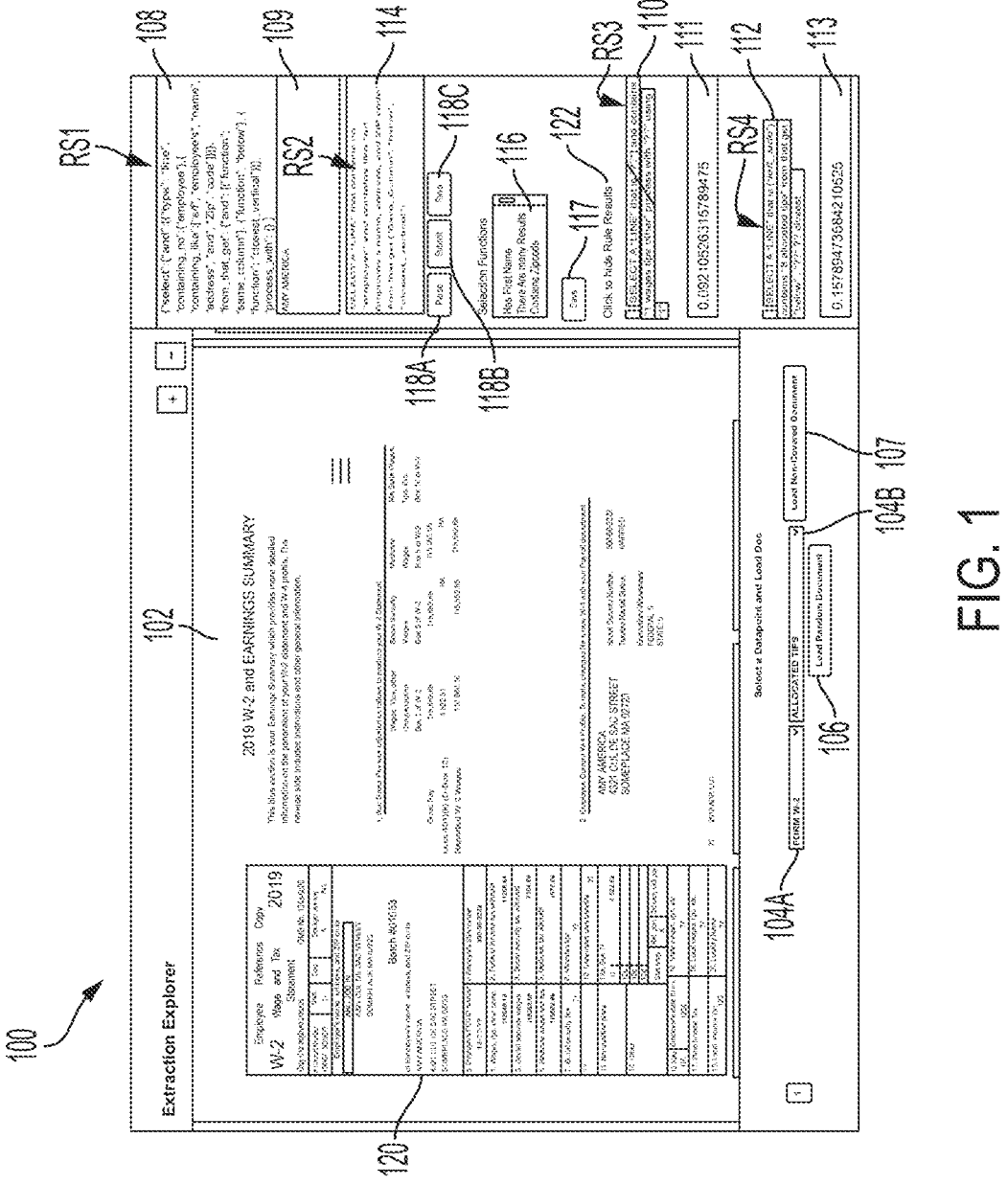
FIG. 1 is an example interface of the extracting query language (ZQL) programming system, according to one embodiment.

In one exemplary embodiment of this disclosure, a method for determining data associated with a record is provided. The method comprises: receiving, using one or more computing device processors, at least one computing record; determining, using the one or more computing device processors, image data associated with the at least one computing record; generating, using the one or more computing device processors, structural data, wherein the structural data is associated with the image data associated with the at least one computing record; generating, using the one or more computing device processors, dimensional data, wherein the dimensional data is associated with the image data associated with the at least one computing record; determining, using the one or more computing device processors, based on the structural data and the dimensional data, a relational graph, wherein the relational graph defines relationships associated with the at least one computing record; determining, using the one or more computing device processors, a first rule associated with processing the at least one computing record; parsing, using the one or more computing device processors, the first rule, thereby generating a first parsed rule; generating, using the one or more computing device processors, based on the first parsed rule, an abstract syntax tree; first analyzing, using the one or more computing device processors, based on a first computing record comprised in the at least one computing record, the abstract syntax tree; generating, using the one or more computing device processors, based on the first analyzing the abstract syntax tree, a first rule result associated with the first rule; applying, using the one or more computing device processors, the first rule to a probabilistic model, wherein the applying the first rule to the probabilistic model comprises: second analyzing, based on the at least one computing record, the abstract syntax tree, and generating, based on the second analyzing the abstract syntax tree, at least one rule result associated with the first rule; determining, using the one or more computing device processors, based on the applying the first rule result to the probabilistic model, a first indicator associated with the first rule result and the at least one rule result; determining, using the one or more computing device processors, based on the first indicator associated with the first rule result and the at least one rule result, whether the probabilistic model requires an update, and upon determining the probabilistic model requires the update, updating, using the one or more computing device processors, the probabilistic model.

According to another exemplary embodiment of this disclosure, a system for determining data associated with a reference record is provided. The system includes one or more computing device processors. One or more computing device memories are coupled to the one or more computing device processors. The one or more computing device memories store instructions executed by the one or more computing device processors, the instructions configured to: receive at least one computing record; determine image data associated with the at least one computing record; generate structural data, wherein the structural data is associated with the image data associated with the at least one computing record; generate dimensional data, wherein the dimensional data is associated with the image data associated with the at least one computing record; determine, based on the structural data and the dimensional data, a relational graph, wherein the relational graph defines relationships associated with the at least one computing record; determine a first rule associated with processing the at least one computing record; parse the first rule, thereby generating a first parsed rule; generate, based on the first parsed rule, a syntax tree; first analyze, based on a first computing record comprised in the at least one computing record, the syntax tree; generate, based on the first analyze the syntax tree, a first rule result associated with the first rule; apply the first rule to a probabilistic model, wherein the apply the first rule to the probabilistic model comprises: second analyzing, based on the at least one computing record, the syntax tree, and generating, based on the second analyzing the syntax tree, at least one rule result associated with the first rule; determine, based on the applying the first rule result to the probabilistic model, an indicator associated with the first rule result; determine, based on the indicator associated with the first rule result, whether the probabilistic model requires an update, and upon determining the probabilistic model requires the update, update the probabilistic model.

In yet another exemplary embodiment of this disclosure, a method for determining data associated with a reference record is provided. The method includes: receiving, using one or more computing device processors, at least one computing record; determining, using the one or more computing device processors, image data associated with the at least one computing record; generating, using the one or more computing device processors, structural data, wherein the structural data is associated with the image data associated with the at least one computing record; generating, using the one or more computing device processors, dimensional data, wherein the dimensional data is associated with the image data associated with the at least one computing record; determining, using the one or more computing device processors, based on the structural data and the dimensional data, a relational graph, wherein the relational graph defines relationships associated with the at least one computing record; determining or receiving, using the one or more computing device processors, a first rule associated with processing the at least one computing record; parsing, using the one or more computing device processors, the first rule, thereby generating a first parsed rule; generating, using the one or more computing device processors, based on the first parsed rule, an abstract syntax tree; first analyzing, using the one or more computing device processors, based on a first computing record comprised in the at least one computing record, the abstract syntax tree; generating, using the one or more computing device processors, based on the first analyzing the abstract syntax tree, a first rule result associated with the first rule; applying, using the one or more computing device processors, the first rule to a probabilistic model, wherein the applying the first rule to the probabilistic model comprises: second analyzing, based on the at least one computing record, the abstract syntax tree, and generating, based on the second analyzing the abstract syntax tree, at least one rule result associated with the first rule; determining, using the one or more computing device processors, based on the applying the first rule result to the probabilistic model, a first indicator associated with the first rule result and the at least one first rule result; determining, using the one or more computing device processors, whether there is an additional record or an additional rule added by a user;

upon determining the user added the additional record, updating, using the one or more computing device processors, based on the additional record, the relational graph, thereby generating an updated relational graph; upon determining the user added the additional rule, updating, using the one or more computing device processors, based on the additional rule, the abstract syntax tree, thereby generating an updated abstract syntax tree; updating, using the one or more computing device processors, based on the updated relational graph and the updated abstract syntax tree, the first indicator associated with the first rule result and the at least one first rule result, thereby generating an updated first indicator; determining, using the one or more computing device processors, a second indicator associated with a second rule result and at least one second rule result associated with the additional rule; determining, using the one or more computing device processors, based on the updated first indicator and the second indicator, whether the probabilistic model requires an update; and upon determining the probabilistic model requires the update, updating, using the one or more computing device processors, the probabilistic model.

One of the difficult parts of using machine learning for document extraction is dealing with the variation of text and layout within a specific document type. There is a need to mimic the natural language descriptions people often give as instructions for how to find information on a document.

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The terminology used herein is for the purpose of describing particular example embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. That is, terms such as "first," "second," and other numerical terms, when used herein, do not imply a sequence or order unless clearly indicated by the context.

The disclosure describes a domain specific, proprietary programming system called the extracting query language (ZQL) programming system for the purpose of describing and mapping data on a document. A web-application based Graphical User Interface (GUI) may be used by users to interact with a document. Also, the GUI may allow users to write rules using a ZQL programming language defined by the ZQL programming system as well as assess results produced by the rules. An artificial intelligence/machine learning statistics process may be used, based on a Naïve Bayesian methodology, for generating probabilistic models which determine the ruleset with the highest probability of accuracy. The ZQL programming system may be implemented using Python. The application programming interfaces (APIs) of the ZQL programming system may be used for the translation of the ZQL programming language for generating rules that may be extensible to any industry standard and integrated into downstream programming processes.

The ZQL programming system may attempt to mimic the natural language descriptions people often give as instructions for how to find information on a document, and to reconcile how both hierarchical and spatial relationships are used dynamically for entity recognition and prediction of data elements in documents.

While disclosure makes references to documents, the ZQL programming system may use other sources of data in place of documents. The other sources of data may be structured or semi structured objects or spatial entities.

The required inputs for the ZQL programming system may be an image (PNG or JPEG) of the relevant pages of a document, as well as a tree-structured knowledge graph of document pages. Users may utilize the simple syntax of the ZQL programming language, which is parsed into an abstract syntax tree and then evaluated on the knowledge graph to produce rule results. A probabilistic model may generate a probability score for the accuracy of a generated rule. Like the rule statement itself, this model can be created from the web-application and the results of it can be evaluated and improved by the end user.

The ZQL programming system may use both hierarchical relationships (e.g., a TABLE contains a CELL) and spatial relationships (e.g. a NUMBER to the left of a WORD, Center, Closest by corner, Closest Euclidean, or the like) to locate data. For instance, the functions "Has Comma," "Has Numbers," and "Has Decimal Point" might be appropriate featurization functions for the model if it intends to find currency data. A Iso, because multiple rules are allowed (and encouraged) for each data, the ZQL programming system may be trained for new document types or templates of the same document type. Similarly, one can easily adapt to spatial noise which comes from the optical character recognition (OCR) and knowledge graph processes. Additionally, the probabilistic model may be an integrated Bayesian model used to score and "promote" the most effective rules both in the development of potentially competing rules, as well as existing rules at runtime, allowing these rules to dynamically adapt to each instance of a document being processed.

The code building process may take the most recent code in the master branch of the source control repository. It instantiates several Lambda services. One, the back-end, does the parsing and execution of the ZQL programming language, as well as the probabilistic inference. The other, the front-end may serve the JavaScript framework which runs in the browser that displays the document and the results of the rules' execution.

When training a new document type, one may go to the URL for the instantiated ZQL instance, select the specific document type, and the data one would like to start with and load a random document. Once the value on the page(s) of the document is found, one may type an appropriate ZQL rule into the provided text-area. While sculpting this rule one can iterate by parsing and executing the rule and seeing the text on the page that is selected. When the rule is satisfactory, it can be saved.

Next, one may choose another random document while seeing the previous rules that were written and the text they capture in the application. This process may continue, where more rules are written, until it is determined the existing rules may be sufficient. Now one may run the "comparison" process which executes every rule on every document in the sample set. The resulting coverage score may determine what percentage of the sample set has its correct value retrieved by one of the rules.

From here, more rules can be specifically crafted for the remaining "uncovered" documents in the sample set. The comparison process can be re-run. If the coverage score is sufficient, probabilistic functions may be selected and saved, and the probabilistic model can be created. Once this has been done, on each new document load, not only may all the existing rules be executed, but their probability score (as well as their resultant text) may be displayed.

The pipeline application of the rules (and probabilistic selection) is aided by the fact that the rules are applied to the pages of the document in parallel. So, for example, if there are 7 rules applied to a 10-page document, 70 different co-routines may be executed at the same time, and the ensuing application only takes the duration of one application.

Moreover, the GUI tool may be an educational device for learning the ZQL programming language. As the trainer increases their skill with writing concise rules for extracting data, they can expand, prune, and continually improve their ruleset. With it, they can get immediate feedback for the shape of their probabilistic model. The ZQL programming system may include an iterative process of growing a ZQL ruleset on a document sample, and improving the probabilistic model followed by a pipeline application of the extraction process to achieve its desired accuracy.

The ZQL programming system allows for rule creation to be done in its own domain specific language. A myriad of special functions for locating and specifying the data on the document may be already available to the trainer (rule-writer) that are simply strung together using the simple ZQL programming language syntax.

In the event of the system being used for a vastly different type of document or industry, the ZQL programming language syntax of the rules can remain the same, with new functions added easily without extensive changes to ZQL programming language's syntax. In this way, the ZQL programming system is adaptable and a starting place for large data extraction jobs.

Because the ZQL programming system may contain both a domain language and an application for development, it could be used in any field where text needs to be extracted from images of physical documents. The ZQL programming system may be implemented so that people who have no prior programming experience can write meaningful rules within minutes.

In some embodiments, the ZQL programming system may include Python data structures (sets, lists, dictionaries, tuples). In some embodiments, the ZQL programming system may use an abstract syntax tree defining the dictionary/J SON (JavaScript Object Notation) representation of a rule and executing that against the dictionary/J SON representation of the knowledge graph of the document(s).

In some embodiments, if there are blocks of sequential, prose-like, text in a document, a recurrent neural network may be used to parse and retrieve the desired text from the document.

FIG. 1 is a schematic diagram of an example interface 100 of the ZQL programming system, according to one embodiment. The example interface 100 may be similar to the GUI of the ZQL programming interface described herein. In this case, the example interface 100 generally shows the overall process of rule development and comparison in accordance with the ZQL programming system mentioned herein. The example interface 100 may display a document 102. The document 102 may have been loaded either as a random document or a non-covered document. The user may make this selection via buttons 106 and 107. If document 102 is a non-covered document, fields 104a and 104b may be entered by the user to determine the grouping of document 102.

The example interface 100 may include a window 108 for a user to visualize an abstract syntax tree RS1 associated with a rule RS2 with the result of executing rule RS2 shown in window 109. Note that the result shown in window 109 corresponds to a field 120 in document 102. The rule RS2 was created using the ZQL programming language syntax of the ZQL programming system. Moreover, the example interface 100 may include window 114 displaying the syntax of rule RS2 being actively developed by the user. The user may reference window 116 to select the appropriate functions for constructing rule RS2. In some cases, the user may add additional functions to the ZQL programming system via window 116 and saving these additional functions via button 117. The functions listed in window 116 are in accordance with the ZQL programming language. When the user has determined the rule RS2 is complete, the user may parse and submit rule RS2 for processing via buttons 118a and 118b producing abstract syntax tree AST1. Afterwards, the abstract syntax tree AST1 may be posted in window 108 and its results posted in window 109, respectively. The user may also save any updates to rule RS2 via button 118c.

During the comparison process, the example interface 100 may display the resulting coverage scores 111, 113 for each of the existing rules RS3 and RS4. The coverage scores 111, 113 may determine what percentage of the sample set has its correct value retrieved by one of the rules. Note that example interface 110 may allow a user to not display the coverage scores 111, 113 via clicking link 122. The existing rules RS3 and RS4 may be previously stored rules which are later retrieved for processing or may be existing rules that are being actively developed.

Figure 2B:
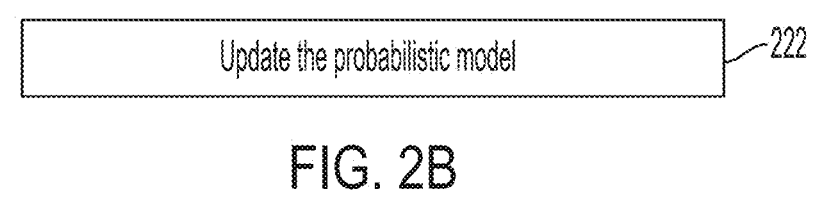

FIGS. 2A-2B is workflow 200 of a method for extracting information from documents, according to one embodiment. At block 202, the method includes receiving, using one or more processors, a plurality of sample documents. The method includes retrieving, using the one or more processors, image information for the sample documents, shown at block 204. At block 206, the method includes generating, using the one or more processors, hierarchical and spatial data of the image information of the sample documents to be used in a knowledge graph, wherein the knowledge graph defines hierarchical and spatial relationships between the sample documents. The knowledge graph defines hierarchical and spatial relationships in the sample documents. At block 208, the method includes determining, using the one or more processors, a plurality of rules applicable for processing the sample documents. At block 210, upon determining the rules applicable for processing the sample documents, retrieving, using the one or more processors, the rules applicable for processing the sample documents.

The method includes parsing, using the one or more processors, the rules to create a plurality of abstract syntax trees, as shown at block 212. Next, at block 214, the method includes generating, using the one or more processors, the abstract syntax trees, and the knowledge graph, a plurality of rule results for the rules applicable for processing the sample documents. Each of the abstract syntax trees is evaluated on the knowledge graph to produce the rule results. Next, at block 216, the method includes applying, using the one or more processors, the rule results to a probabilistic model to determine accuracy of the rule results. Next, at block 218, the method includes generating, using the one or more processors and the probabilistic model, a plurality of scores for each of the rules indicating accuracy of the rules, and at block 220 the method includes determining, using the one or more processors, whether the scores require updating the probabilistic model. At block 222, the method includes upon determining the scores are sufficient, updating, using the one or more processors, the probabilistic model.

FIGS. 3A-3B is workflow 300 of a method for extracting information from documents, according to one embodiment. At block 302, the method includes receiving, using one or more processors, a plurality of sample documents. Next, at block 304, the method includes retrieving, using the one or more processors, image information for the sample documents. Next, at block 306, the method includes generating, using the one or more processors, hierarchical and spatial data of the image information of the sample documents to be used in a knowledge graph, wherein the knowledge graph defines hierarchical and spatial relationships between the sample documents. Next, at block 308, the method includes determining, using the one or more processors, a plurality of rules applicable for processing the sample documents. At block 310, the method includes upon determining the rules applicable for processing the sample documents, retrieving, using the one or more processors, the rules applicable for processing the sample documents.

At block 312, the method includes parsing, using the one or more processors, the rules to create a plurality of abstract syntax trees. Next, at block 314, the method includes generating, using the one or more processors, the abstract syntax trees, and the knowledge graph, a plurality of rule results for the rules applicable for processing the sample documents, wherein each of the abstract syntax trees is evaluated on the knowledge graph to produce the rule results. Next, at block 316, the method includes applying, using the one or more processors, the rule results to a probabilistic model to determine accuracy of the rule results, and at block 318 the method includes generating, using the one or more processors and the probabilistic model, a plurality of scores for each of the rules indicating accuracy of the rules.

At block 320, the method includes determining, using the one or more processors, whether there is at least one additional sample document or at least one additional rule added by a user. Next, at block 322, the method includes upon determining the user added the least one additional sample document, updating, using the one or more processors, the knowledge graph to reflect changes presented by the at least one additional sample document. Next, at block

324, the method includes upon determining the user added the least one additional rule, updating, using the one or more processors, the abstract index trees to reflect changes presented by the at least one additional rule. Next, at block 326, the method includes updating, using the one or more processors, the updated knowledge graph, and the updated abstract syntax trees, the scores for each of the rules and the at least one additional rule. Next, at block 328, the method includes determining, using the one or more processors, whether the updated scores require updating the probabilistic model. At block 330, the method includes upon determining the probabilistic model requires updating, updating, using the one or more processors, the probabilistic model.

Figure 4:
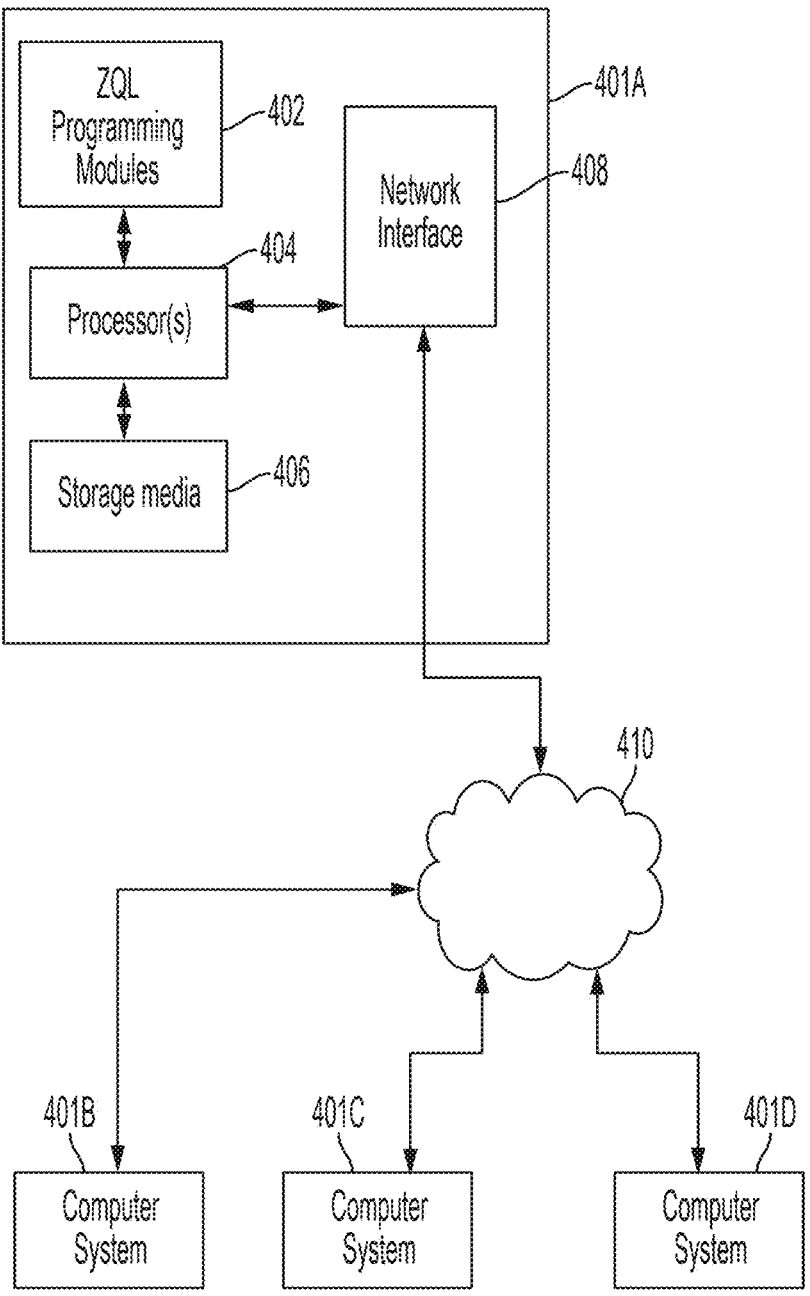
FIG. 4 is an example computing system in accordance with carrying out some of the methods of the present disclosure, according to one embodiment.

FIG. 4 depicts an example computing system 400 in accordance with carrying out some of the methods of the present disclosure, in accordance with some embodiments. For example, the computing system 400 may perform the workflows 200 and 300 described herein.

The computing system 400 can be an individual computer system 401A or an arrangement of distributed computer systems. The computer system 401A includes one or more ZQL programming modules 402 that are configured to perform various tasks of the ZQL programming system described herein. To perform these various tasks, ZQL programming module(s) 402 executes independently, or in coordination with, one or more processors 404, which is (or are) connected to one or more storage media 406. The processor(s) 404 is (or are) also connected to a network interface 408 to allow the computer system 401A to communicate over a data network 410 with one or more additional computer systems and/or computing systems, such as 401B, 401C, and/or 401D (note that computer systems 401B, 401C and/or 401D may or may not share the same architecture as computer system 401A, and may be located in different physical locations, e.g., computer systems 401A and 401B may be on a ship underway on the ocean, while in communication with one or more computer systems such as 401C and/or 401D that are located in one or more data centers on shore, other ships, and/or located in varying countries on different continents). Note that data network 410 may be a cloud service, a private network, it may use portions of public networks, it may include remote storage and/or applications processing capabilities (e.g., cloud computing).

A processor can include a microprocessor, microcontroller, processor module or subsystem, programmable integrated circuit, programmable gate array, or another control or computing device.

The storage media 406 can be implemented as one or more computer-readable or machine-readable storage media. Note that while in the example embodiment of FIG. 4 storage media 406 is depicted as within computer system 401A, in some embodiments, storage media 406 may be distributed within and/or across multiple internal and/or external enclosures of computing system 401A and/or additional computing systems. Storage media 406 may include one or more different forms of memory including semiconductor memory devices such as dynamic or static random access memories (DRAMs or SRAM s), erasable and programmable read-only memories (EPROM s), electrically erasable and programmable read-only memories (EEPROM s) and flash memories; magnetic disks such as fixed, floppy and removable disks; other magnetic media including tape; optical media such as compact disks (CDs) or digital video disks (DVDs), BluRays or any other type of optical media; or other types of storage devices. "Non-transitory" computer readable medium refers to the medium itself (i.e., tangible, not a signal) and not data storage persistency (e.g., RAM vs. ROM).

Note that the instructions or methods discussed above can be provided on one computer-readable or machine-readable storage medium, or alternatively, can be provided on multiple computer-readable or machine-readable storage media distributed in a large system having possibly plural nodes and/or non-transitory storage means. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions or located at a remote site from which machine-readable instructions can be downloaded over a network for execution.

It should be appreciated that computer system 401A is one example of a computing system, and that computer system 401A may have more or fewer components than shown, may combine additional components not depicted in the example embodiment of FIG. 4, and/or computer system 401A may have a different configuration or arrangement of the components depicted in FIG. 4. The various components shown in FIG. 4 may be implemented in hardware, software, or a combination of both, hardware and software, including one or more signal processing and/or application specific integrated circuits.

It should also be appreciated that while no user input/output peripherals are illustrated with respect to computer systems 401A, 401B, 401C, and 401D, many embodiments of computing system 400 include computing systems with keyboards, touch screens, displays, etc. Some computing systems in use in computing system 400 may be desktop workstations, laptops, tablet computers, smartphones, server computers, etc. Some computing systems in use in computing system 400 may include human visual interfaces such as virtual and augmented reality interfaces, brain chip interfaces, or other technology computing and bleeding edge interaction mechanisms.

Further, the steps in the processing methods described herein may be implemented by running one or more functional modules in an information processing apparatus such as general-purpose processors or application specific chips, such as ASICs, FPGAS, PLDs, or other appropriate devices. These modules, combinations of these modules, and/or their combination with general hardware are included within the scope of protection of the disclosure.

In some embodiments, a computing system is provided that comprises at least one processor, at least one memory, and one or more programs stored in the at least one memory, wherein the programs comprise instructions, which when executed by the at least one processor, are configured to perform any method disclosed herein.

In some embodiments, a computer readable storage medium is provided, which has stored therein one or more programs, the one or more programs comprising instructions, which when executed by a processor, cause the processor to perform any method disclosed herein.

In some embodiments, a computing system is provided that comprises at least one processor, at least one memory, and one or more programs stored in the at least one memory; and means for performing any method disclosed herein.

In some embodiments, an information processing apparatus for use in a computing system is provided, and that includes means for performing any method disclosed herein.

In some embodiments, a graphics processing unit is provided, and that includes means for performing any method disclosed herein.

In some embodiments, the ZQL programming system may include industry standard available libraries and packages used in open source frameworks. In some embodiments, the ZQL programming system may include Data Frames, formed using industry standard available libraries and packages, to store the tabular data of the results of multiple rules on multiple pages.

The disclosure describes a ZQL programming system that may allow for the codification of human intuition and domain expertise about complicated documents and where to find data on them. The ZQL programming language allows for rule development that is as close to natural language as possible and so it's easy to learn and begin encoding the knowledge of how to find the data. Also, the ZQL programming system may utilize a probabilistic model that is configurable (simply, by non-programmers) so that the user can encode their "common sense" as to what the data should look like. In this way, people and organizations with little technical expertise can use their common sense and understanding of the documents to quickly train a system that can run extraction pipelines on enormous document sets.

This application incorporates by reference the entirety of U.S. patent application Ser. No. 17/669,481, titled "System and Method For Extracting Data From a Source," filed on Feb. 11, 2022.

Reference in the specification to "one implementation" or "an implementation" means that a particular feature, structure, or characteristic described in connection with the implementation is included in at least one implementation of the disclosure. The appearances of the phrase "in one implementation," "in some implementations," "in one instance," "in some instances," "in one case," "in some cases," "in one embodiment," or "in some embodiments" in various places in the specification are not necessarily all referring to the same implementation or embodiment. In some embodiments, the terms "signal," "data," and/or "information" may be used interchangeably. In some embodiments, signals refer to non-transitory signals.

Finally, the above descriptions of the implementations of the present disclosure have been presented for the purposes of illustration and description. It is not intended to be exhaustive or to limit the present disclosure to the precise form disclosed. Many modifications and variations are possible in light of the above teaching. It is intended that the scope of the present disclosure be limited not by this detailed description, but rather by the claims of this application. As will be understood by those familiar with the art, the present disclosure may be embodied in other specific forms without departing from the spirit or essential characteristics thereof. Accordingly, the present disclosure is intended to be illustrative, but not limiting, of the scope of the present disclosure, which is set forth in the following claims.

What is claimed is:

1. A method for determining data associated with at least one computing record using a probabilistic computing operation, the method comprising:

receiving, using one or more computing device processors, from a first user, at least one computing record;

determining, using the one or more computing device processors, image data associated with the at least one computing record;

generating, using the one or more computing device processors, structural data, wherein the structural data comprises one or more hierarchical relationships based on the image data associated with the at least one computing record;

generating, using the one or more computing device processors, dimensional data, wherein the dimensional data comprises one or more spatial relationships based on the image data associated with the at least one computing record;

determining, using the one or more computing device processors, based on the structural data comprising the one or more hierarchical relationships based on the image data associated with the at least one computing record and the dimensional data comprising the one or more spatial relationships based on the image data associated with the at least one computing record, a relational graph, wherein the relational graph defines relationships associated with the at least one computing record;

receiving, using the one or more computing device processors, from the first user, a first rule associated with processing the at least one computing record;

parsing, using the one or more computing device processors, the first rule, thereby generating a first parsed rule;

generating, using the one or more computing device processors, based on the first parsed rule, an abstract syntax tree;

first analyzing, using the one or more computing device processors, based on a first computing record comprised in the at least one computing record, the abstract syntax tree;

generating, using the one or more computing device processors, based on the first analyzing the abstract syntax tree, a first rule result associated with the first rule;

applying, using the one or more computing device processors, the first rule to a probabilistic computing operation, wherein the applying the first rule to the probabilistic computing operation comprises:

second analyzing, based on the at least one computing record, the abstract syntax tree, and generating, based on the second analyzing the abstract syntax tree, at least one first rule result associated with the first rule;

determining, using the one or more computing device processors, based on the applying the first rule result to the probabilistic computing operation, a first indicator associated with the first rule result and the at least one first rule result;

determining, using the one or more computing device processors, based on the first indicator associated with the first rule result and the at least one first rule result, whether the probabilistic computing operation requires an update; and upon determining the probabilistic computing operation requires the update, updating, using the one or more computing device processors, the probabilistic computing operation.

2. The method of claim 1, wherein the determining the image data comprises performing an optical character recognition (OCR) operation on the at least one computing record.

3. The method of claim 1, wherein the determining the image data comprises adapting to spatial noise introduced by an optical character recognition (OCR) operation on the at least one computing record.

4. The method of claim 1, wherein the first indicator associated with the first rule result and the at least one first rule result comprises an approximate accuracy or a score or a coverage value associated with the at least one computing record.

5. The method of claim 1, wherein the determining the relational graph comprises adapting to spatial noise.

6. The method of claim 1, wherein the first rule associated with processing the at least one computing record comprises an existing rule or a rule under development.

7. The method of claim 6, wherein the first rule is associated with a domain specific language.

8. The method of claim 1, wherein the parsing the first rule comprises utilizing a recurrent neural network.

9. The method of claim 1, wherein the applying the first rule to the probabilistic computing operation comprises utilizing a Naive Bayesian methodology to assess the first rule result.

10. The method of claim 1, wherein the applying the first rule to the probabilistic computing operation comprises allowing the probabilistic computing operation to determine, based on a history of rule results, a selection of the first rule or a first existing rule comprised in at least one existing rule to be applied to a second computing record.

11. The method of claim 1, wherein the determining whether the probabilistic computing operation requires the update comprises identifying a second computing record comprised in the at least one computing record that, upon applying the first rule, does not return a correct result.

12. The method of claim 1, wherein the determining whether the probabilistic computing operation requires the update comprises determining whether the probabilistic computing operation comprises a first shape.

13. The method of claim 1, wherein the updating the probabilistic computing operation comprises:

receiving, using the one or more computing device processors, from the first user, a second rule associated with processing the at least one computing record;

parsing, using the one or more computing device processors, the second rule, thereby generating a second parsed rule;

updating, using the one or more computing device processors, based on the second parsed rule, the abstract syntax tree;

third analyzing, using the one or more computing device processors, based on a second computing record comprised in the at least one computing record, the abstract syntax tree;

generating, using the one or more computing device processors, based on the third analyzing the abstract syntax tree, a second rule result associated with the second rule; and applying, using the one or more computing device processors, the second rule result to the probabilistic computing operation.

14. The method of claim 1, wherein the probabilistic computing operation accounts for variance among the at least one computing record.

15. The method of claim 14, wherein the variance comprises at least one of: spatial variance or linguistic variance.

16. The method of claim 14, wherein the updating the probabilistic computing operation is based on or associated with the variance among the at least one computing record.

17. The method of claim 1, further comprising:

determining, using the one or more computing device processors, at least one of: an additional record added by the first user, or an additional rule added by the first user;

upon determining the first user added the additional record, updating, using the one or more computing device processors, based on the additional record, the relational graph, thereby generating an updated relational graph;

upon determining the first user added the additional rule, updating, using the one or more computing device processors, based on the additional rule, the abstract syntax tree, thereby generating an updated abstract syntax tree;

applying, using the one or more computing device processors, the additional rule to the probabilistic computing operation, wherein the applying the additional rule to the probabilistic computing operation comprises:

analyzing, based on the at least one computing record, the updated abstract syntax tree, and generating, based on the analyzing the updated abstract syntax tree, at least one second rule result associated with the additional rule;

updating, using the one or more computing device processors, based on the applying the additional rule to the probabilistic computing operation, the first indicator associated with the first rule result and the at least one first rule result, thereby generating an updated first indicator; and determining, using the one or more computing device processors, a second indicator associated with the at least one second rule result associated with the additional rule.

18. A system for determining data associated with at least one computing record using a probabilistic computing operation, the system comprising:

one or more computing device processors; and one or more computing device memories, coupled to the one or more computing device processors, the one or more computing device memories storing instructions executed by the one or more computing device processors, wherein the instructions are configured to:

receive, from a first user, at least one computing record;

determine image data associated with the at least one computing record;

generate structural data, wherein the structural data comprises one or more hierarchical relationships based on the image data associated with the at least one computing record;

generate dimensional data, wherein the dimensional data comprises one or more spatial relationships based on the image data associated with the at least one computing record;

determine, based on the structural data comprising the one or more hierarchical relationships based on the image data associated with the at least one computing record and the dimensional data comprising the one or more spatial relationships based on the image data associated with the at least one computing record, a relational graph, wherein the relational graph defines relationships associated with the at least one computing record;

receive, from the first user, a first rule associated with processing the at least one computing record;

parse the first rule, thereby generating a first parsed rule;

generate, based on the first parsed rule, a syntax tree;

first analyze, based on a first computing record comprised in the at least one computing record, the syntax tree;

generate, based on the first analyze the syntax tree, a first rule result associated with the first rule;

apply the first rule to a probabilistic computing operation, wherein the apply the first rule to the probabilistic computing operation comprises:

second analyzing, based on the at least one computing record, the syntax tree, and generating, based on the second analyzing the syntax tree, at least one rule result associated with the first rule;

determine, based on the applying the first rule result to the probabilistic computing operation, an indicator associated with the first rule result and the at least one rule result;

determine, based on the indicator associated with the first rule result and the at least one rule result, whether the probabilistic computing operation requires an update; and upon determining the probabilistic computing operation requires the update, update the probabilistic computing operation.

19. The system of claim 18, wherein the instructions are further configured to provide a user interface for displaying rules that have been executed.

20. The system of claim 18, wherein the instructions are further configured to provide a user interface for displaying details associated with at least one of the at least one computing record.

21. The system of claim 18, wherein the instructions are further configured to provide a user interface for allowing the first user to input at least one of the at least one computing record and the first rule.

22. The system of claim 18, wherein the instructions are further configured to provide a user interface for displaying details associated with at least one rule that is being developed.

23. The system of claim 18, wherein the instructions are further configured to provide a user interface for displaying details associated with the indicator associated with the first rule result.

\* \* \* \* \*